United States Patent
Bucknell et al.

(10) Patent No.: US 6,796,134 B1
(45) Date of Patent: Sep. 28, 2004

(54) CHARGE AIR INTERCOOLER HAVING A FLUID LOOP INTEGRATED WITH THE VEHICLE AIR CONDITIONING SYSTEM

(75) Inventors: John R. Bucknell, Royal Oak, MI (US); Marc Musial, Leonard, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/634,237

(22) Filed: Aug. 5, 2003

(51) Int. Cl.[7] .................... F02B 33/00; B60H 3/04; F25D 11/00
(52) U.S. Cl. .................. 62/133; 62/238.6; 62/323.1; 123/542; 123/563; 60/599
(58) Field of Search .................. 62/133, 199, 200, 62/238.6, 238.7, 238.1, 323.1, 323.4; 123/540, 542, 563; 60/599

(56) References Cited

U.S. PATENT DOCUMENTS

| | | | | |
|---|---|---|---|---|
| 3,441,011 A | * | 4/1969 | Karl ......................... | 123/542 |
| 4,425,765 A | * | 1/1984 | Fukushima et al. ......... | 62/133 |
| 4,480,439 A | * | 11/1984 | Yamane ...................... | 60/599 |
| 4,510,764 A | * | 4/1985 | Suzuki ........................ | 62/133 |
| 4,683,725 A | * | 8/1987 | Sugiura ...................... | 62/199 |
| 6,006,540 A | * | 12/1999 | Coletti ....................... | 62/430 |
| 6,298,675 B1 | * | 10/2001 | Dage et al. ................. | 62/133 |
| 6,347,618 B1 | * | 2/2002 | Klem ......................... | 123/561 |
| 6,394,076 B1 | * | 5/2002 | Hudelson ................... | 123/540 |
| 6,561,169 B2 | * | 5/2003 | Sealy et al. ................ | 123/563 |

* cited by examiner

Primary Examiner—Harry B. Tanner
(74) Attorney, Agent, or Firm—Ralph E. Smith

(57) ABSTRACT

An intercooler for a vehicle engine incorporating an exhaust gas turbocharger and an air conditioning system, the intercooler comprising: a charge air cooler loop operatively connected to cool heated, pressurized air from the turbocharger before it flows into the vehicle engine; and an air conditioning system bypass loop operatively connecting the air conditioning system to the charge air cooler loop.

3 Claims, 2 Drawing Sheets

CHARGE AIR INTERCOOLER HAVING A FLUID LOOP INTEGRATED WITH THE VEHICLE AIR CONDITIONING SYSTEM

FIELD OF THE INVENTION

The present invention generally pertains to an intercooler for manifold intake air. More particularly, the present invention relates to an intercooler arrangement for a turbocharged or supercharged motor vehicle engine having a charge air cooler fluid loop to which additional cooling capacity is provided via a bypass circuit from the vehicle air conditioning system.

BACKGROUND OF THE INVENTION

The terms "turbocharging" and "supercharging" both refer to methods of increasing the air or air/fuel mixture density of a motor vehicle engine by increasing the pressure of the intake air stream prior to its entering the engine cylinder. Increasing the density of air in the cylinder is desirable because it represents a relatively simple method of increasing the power generated by the engine. Turbocharging generally means that the air intake compressor is powered by the engine exhaust stream. Supercharging generally means that the air intake compressor is powered by coupling it to the engine via a belt, chain, gear(s), etc. Turbocharging is often favored over supercharging because current designs are more efficient at harvesting the energy in the exhaust stream. This increased efficiency currently means that turbocharging permits an increase in the engine power output without a significant decrease in fuel economy. The term, "charger" and "charging" is used herein to refer to both turbochargers and superchargers.

Since pressure is directly related to heat, as the charger increases the pressure of the intake air stream it also increases its temperature. It is well known that cooling this intake air stream further permits an additional increase in its pressure since cooler air can be more densely packed. This additional cooling is generally accomplished through the use of an intercooler.

The simplest intercooler involves incorporating a heat exchanger into the air stream between the charger and the engine intake manifold. Such a heat exchanger can incorporate fins, coils, or a combination thereof to improve the rate at which heat is absorbed and re-radiated into the ambient environment. However, even if the placement and plumbing of the heat exchanger are optimized the ambient air temperature as well as the temperature at the air intake point represent uncontrollable variables.

U.S. Pat. No. 4,683,725 to Sugiura; U.S. Pat. No. 5,435,289 to Pendlebury, et al.; and U.S. Pat. No. 6,394,076 B1 to Hudelson; all describe designs that eliminate the problems of a passive intercooler loop. Each of these patents describes an intercooler located in the intake air stream between the charger and the combustion chamber where the intercooler contains a heat exchanger that is cooled by the vehicle's air conditioning system. These designs permit reasonably uniform cooling of the intake air stream. However, the need for maximum cooling of the intake air stream and the passenger compartment are most likely to occur simultaneously. In the best case, this significantly reduces engine efficiency and erases the power gains from charger/engine combination. In the worst case, failure of the air conditioning, charger, and/or engine can result.

Motor vehicles have been increasing in complexity since Henry Ford ushered in the age of manufactured vehicles. With each successive model year an increasing number of features that contribute to the performance, safety, and operator comfort have been incorporated into vehicles. Features that were once optional are now standard equipment. Probably the only negative aspect of this trend is ever diminishing space in the engine compartment. Thus, it is most desirable for components that improve engine performance to be compact and retain their functionality no matter where they are mounted in the engine compartment.

Compared to a charger, an intercooler is a simple and relatively inexpensive component. With this fact in mind, it would seem that the use of an intercooler would generally be easy to justify because its contribution to the operating efficiency of the charger is greater than its expense, size, and weight. While simple intercoolers are found on many turbocharged vehicles, improved intercoolers, such as described above, have not been adopted for production vehicles. It appears that this is because their contribution to improved vehicle performance is outweighed by their expense, size, and weight compared to the simplest intercooler or no intercooler at all. Thus, it would be advantageous to provide an improved intercooler design that would be inexpensive and small, yet still capable of significantly increasing the efficiency of the charger.

SUMMARY OF THE INVENTION

One object of the present invention is an improved intercooler arrangement for a motor vehicle that is inexpensive, efficient, and relatively small.

Another object of the invention is an intercooler that is adaptable to a variety of engine sizes and configurations and capable of efficiently cooling the intake air stream.

These and other objects are satisfied by an intercooler for a vehicle engine incorporating an exhaust gas turbocharger and an air conditioning system, the intercooler comprising: a charge air cooler loop operatively connected to cool heated, pressurized air from the turbocharger before it flows into the vehicle engine; and an air conditioning system bypass loop operatively connecting the air conditioning system to the charge air cooler loop.

DETAILED DESCRIPTION OF THE INVENTION

The intercooler of the present invention may be used with an exhaust gas turbocharger, any type of supercharger, and naturally or normally aspirated engines having an air conditioning system. In the Figures, like numbers refer to like parts.

Figure 1:
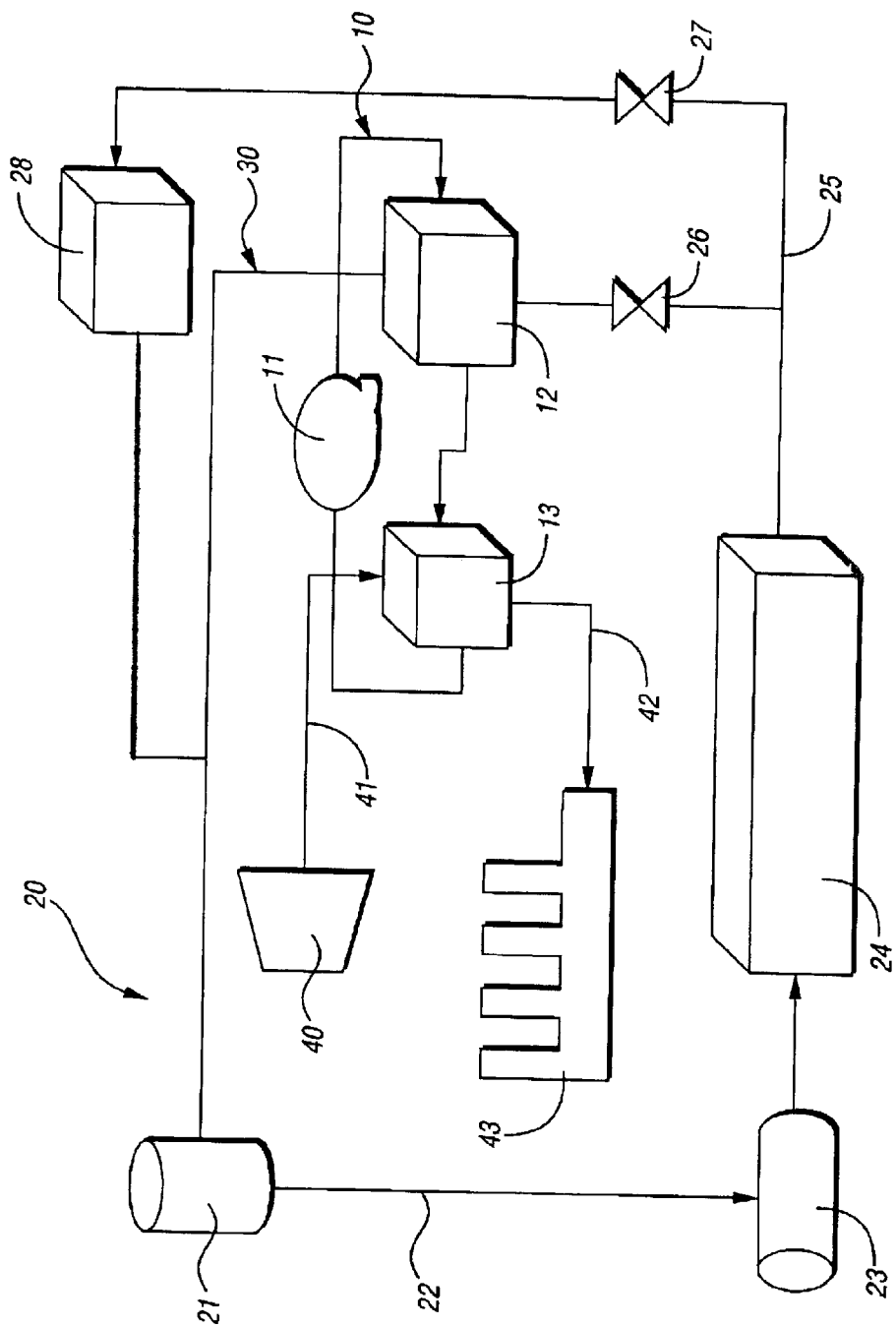
FIG. 1 is a schematic of an embodiment of the present invention.

FIG. 1 illustrates a turbocharger or supercharger 40 as a source of a hot, compressed air stream 41. This hot compressed air stream 41 is directed through a charge air cooler 13 and emerges as a cool compressed air stream 42 that is then directed into the engine manifold 43 and from there to the engine cylinders. (The connections between the engine, the charger, and manifold are well known and therefore not illustrated.)

Unlike the prior art (such as discussed in the Background of the Invention, above), an intercooler of the present invention is a two loop system having a charge air cooler loop 10 operatively connected to cool pressurized air from a charger 40 and an air conditioning system bypass loop 30 that operatively connects the air conditioning system 20 to the charge air cooler loop 10. This arrangement results in a simple more cost effective system that uses compact components, that can be mounted in almost any available space in the engine compartment. In addition, the described intercooler is readily adaptable to a variety of engine sizes, charger types, desired performance parameters, etc.

More specifically, the charge air cooler loop 10 comprises a charge air cooler 13 and a charge air cooler evaporative core 12. A pump 11 may be incorporated in this loop, as well as a low-temperature reservoir. Plumbing between the components may be made of plastic, rubber, metal or a combination thereof, and may be rigid or flexible depending on specific vehicle requirements. In order to reduce radiated noise from low stiffness ducts (flexible hoses) and thin wall ducts it is preferable to minimize the extent of such connections by engine mounting the components to the greatest extent possible.

The air conditioning system can be any standard air conditioning system. The illustrated air conditioning system 20 is an example. This system comprises an accumulation reservoir 21 connected via a suction line 22 to a compressor 23. The compressor 23 is powered by a connection to the vehicle engine (not shown). Gaseous coolant is sucked through the suction line 22 by the compressor 23 where it is compressed. This pressurized gaseous coolant flows from the compressor 23 to the condenser 24 where the heat from the pressurization is dissipated and the coolant condenses to a liquid. During normal operation of the air conditioning system 20, the electronic expansion valve 26 is closed and the electronic expansion valve 27 is open which permits liquid coolant to flow along the liquid line 25 and through the expansion valve 27. As it passes through the expansion valve 27, the liquid coolant boils and vaporizes resulting in a significant temperature drop. The cold liquid is then sucked, by the negative pressure created by the compressor 23, through the cabin evaporation core 28 where the cabin air is cooled.

During operation of the vehicle engine, the charger 40 generates the hot compressed air stream 41 which flows through the charge air cooler 13. In the charge air cooler 13, the heat in the compressed air stream is extracted producing the cool compressed air stream 42 that is directed into the manifold 43 (and then into the engine cylinders). Increased cooling capacity above that of a standard intercooler is provided by the charge air cooler loop 10. Preferably, this loop is a glycol-water loop comprising the charge air cooler 13, a pump 11, and a charge air cooler evaporative core 12. When the engine is in operation, the pump 11 circulates the glycol-water mix through the charge air cooler 13 where it picks up heat from the hot compressed air stream 41. The glycol-water mix then flows through the charge air cooler evaporative core 12 where the heated glycol-water mix is cooled.

A unique aspect of the present invention is the incorporation of the cooling capacity of the existing vehicle air conditioning system to provide additional cooling capacity beyond that which can be provided by the charge air evaporative core 12. When such additional capacity is needed, the expansion valve 26 in the air conditioning system is opened to direct cold liquid for the air conditioning system 20 to enter the air conditioning bypass loop 30 and flow through the charge air evaporative core 12. Depending on a variety of systems parameters, when the expansion valve 26 is open, the expansion valve 27 can be opened or closed.

A particular benefit of the present invention is that it permits significant flexibility in size and placement of the system components. In general, sizing a turbocharger or supercharger is based on peak output requirements that are normally reached for only a small fraction of the engine's overall operating time. With prior art systems, this necessitated the use of relatively large components. For example, a turbocharger designed to function without an intercooler must be relatively large. The use of an intercooler permits a reduction in the size of the turbocharger. By incorporating only a charge air cooling loop, as described above, a slightly smaller turbocharger can be used. By using a charge air cooling loop in conjunction with an air conditioning bypass loop as described herein, all components can be reduced in size, thereby improving the efficiency of cost, sizing, placement, etc. with no loss in engine performance.

A desirable configuration of the present invention that appears to deliver maximum benefit for minimum cost tailors the operation of the charge air cooler loop and the air conditioning bypass loop to the desired engine power output. When the vehicle engine is at idle, both the charge air cooler loop 10 and air conditioning bypass loop 30 are in a standby state. (Depending on the system configuration, it may also be desirable to permit passive convective flow of the coolant in the charge air cooler loop 10 when the pump 11 is in the power down mode.) When mid range power output is desired (such as cruising at high speed), the water pump 11 is actuated to provide additional cooling for the charge air cooler loop; the air conditioning bypass loop is turned off. When peak power output from the engine is desired (such as accelerating up to speed), the water pump 11 actively circulates coolant in the charge air cooler loop 10, and additional cooling capacity is contributed by actuating the air conditioner bypass loop 30 by opening the expansion valve 26. At times when the air conditioning system is being operated to cool the cabin, it is most desirable to modulate the operation of the air conditioning loop by closing the expansion valve 27 when the expansion valve 26 is open and vice versa. Since such peak power demands of the engine are of relatively short duration, the diversion of the air conditioning system to only cool engine intake air by opening valve 26 and closing valve 27 is nearly invisible to the vehicle occupants.

A further preferred aspect of the present invention is the use of a control algorithm that activates the air conditioning bypass loop 30 when the operator applies the vehicle brakes. This effectively uses the air conditioning system to brake the engine (and "saves" energy normally lost as heat generated at the brakes) while simultaneously pre-cooling the coolant in the charge air cooler loop 10 Preferably, a low temperature reservoir is provided in the charge air cooler loop 10 to provide additional thermal mass to store pre-cooled coolant. Most preferably, the charge air cooler loop is plumbed so that the overflow bottle for the vehicle engine radiator serves as the low temperature thermal mass reservoir.

For some applications, it may be desirable run the turbocharger or supercharger almost continuously. In such a situation, the charge air coolant loop 10 and the air conditioning bypass loop 30 might need to operate very frequently to nearly continuously to provide sufficient cooling capacity to cool the hot compressed air stream 41 to the desired pressure/temperature before it is directed to the engine manifold. In some situations, continuous operation of both loops 10, 30 is more efficient if a low temperature thermal mass reservoir is incorporated into the charge air coolant loop 10.

Figure 2:
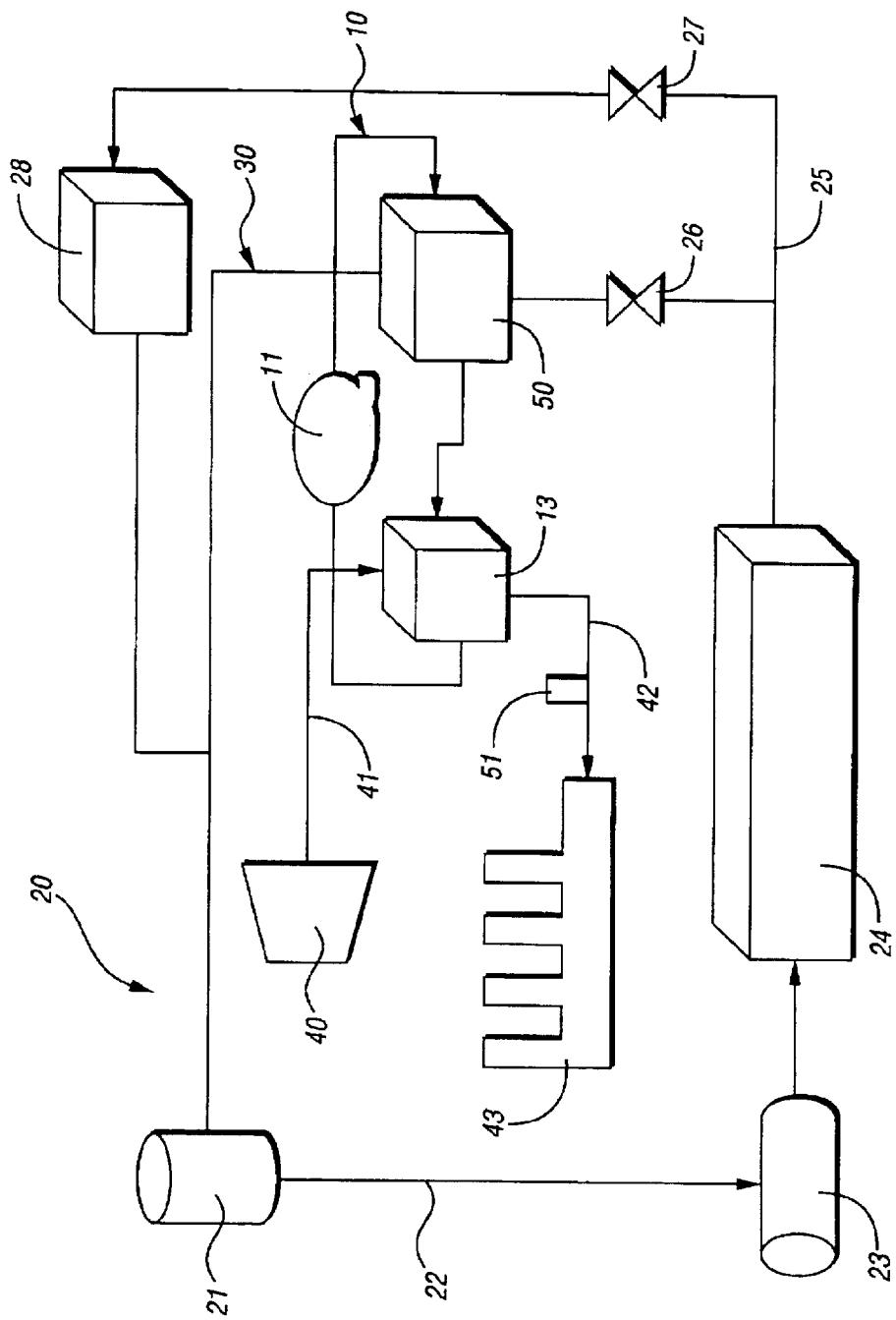
FIG. 2 is a schematic of an alternate embodiment of the present invention.

FIG. 2 illustrates one optimized configuration of the present invention. This embodiment comprises a charger 40, a charge air cooler loop 10, and an air conditioning bypass loop 30. In addition, a low temperature thermal mass reservoir is included in this embodiment as a combination low-temperature reservoir/charge air cooling evaporative core 50. The combination reservoir/core 50 consists of a charge air cooling evaporative core located inside a low-temperature reservoir. The operative connection between the charge air cooler loop 10 and the air conditioning bypass loop 30 is through the combination reservoir/core 50.

To maximize the efficiency of this embodiment, the system is configured to operate the air conditioner bypass loop 30 whenever its operation puts minimum load on the system, for example: when additional cooling of the cabin is unnecessary, when the air conditioner bypass loop is being operated to provide engine braking (as described above), or when the vehicle is cruising at a steady speed and the opening and closing of the expansion valves 26 and 27 can be modulated transparently to the vehicle occupants.

As the air conditioning bypass loop 30 cycles very cold refrigerant from the air conditioning system 20, the coolant in the low temperature reservoir 51 is chilled. The temperature of the cool air stream 42 is continuously monitored by the temperature sensor 51. (The numbering and positioning of appropriate sensors will be determined by specific application configurations. The sensor 51 is not intended to limit the number and positioning of such sensors, merely illustrate a possible location.) If the temperature of the cool air stream 42 falls above or below a preset range, an integrated system controller, the vehicle CPU, etc will operate the auxiliary pump 11 accordingly. For example, the pump 11 can be turned off or on, or sped up or slowed down (depending on the pump) as needed to move less/more of the coolant from the combination low-temperature reservoir/charge air cooling evaporative core 50.

Another aspect of the present invention is a normally or naturally aspirated vehicle engine having an air conditioning system that utilizes a charge air cooler loop and an air conditioning bypass loop as described above for charged engines. The benefits of such a system are obvious.

The vehicle engine size, the intended use of the vehicle, the desired vehicle performance characteristics, etc. will dictate the actual sizing, positioning, and configuration of the various components of the present invention. Obviously, the use of appropriately placed sensors as well as integrated electronic controls will provide maximum operating efficiency of taking into account vehicle size, use, performance, etc. Control algorithms with "look ahead" routines can provide pre-cooling as needed for maximum efficiency. Depending on a variety of factors, it might be most desirable to use a very small charger, cooler loop, and bypass loop that operate almost continuously.

While specific embodiments of an intercooler according to the present invention have been disclosed and described herein, alternative embodiments of these and other components of the invention will occur to those of skill in the art. For example, variations on the combinations of the embodiments illustrated in FIGS. 1 and 2 with the size of the different loops, the charger type, etc. Other obvious variations will be suggested through improvements and new developments of appropriate resilient metal and thermoplastic materials, for example, that can be readily adapted by one skilled in the art. Accordingly, the scope of this invention is to be considered limited only by the following claims.

What is claimed:

1. An intercooler for a vehicle engine incorporating an exhaust gas turbocharger and an air conditioning system, said intercooler comprising:

a charge air cooler loop employing a glycol-water coolant and including a low temperature reservoir, said charge air cooler loop operatively connected to cool heated, pressurized air from said turbocharger before it flows into said vehicle engine; and an air conditioning system bypass loop operatively connecting said air conditioning system to said charge air cooler loop;

where said charge air cooler loop and said air conditioning system bypass loop are configured so that said air conditioning system bypass loop operates during vehicle braking to cool said glycol-water coolant to charge said low temperature reservoir.

2. An intercooler for a vehicle engine incorporating a supercharger and an air conditioning system, said intercooler comprising:

a charge air cooler loop employing a glycol-water coolant and including a low temperature reservoir, said charge air cooler loop operatively connected to cool heated, pressurized air from said supercharger before it flows into said vehicle engine; and an air conditioning system bypass loop operatively connecting said air conditioning system to said charge air cooler loop;

where said charge air cooler loop and said air conditioning system bypass loop are configured so that said air conditioning system bypass loop operates during vehicle braking to cool said glycol-water coolant to charge said low temperature reservoir.

3. An intercooler for a naturally aspirated vehicle engine incorporating a manifold and an air conditioning system, said intercooler comprising:

a charge air cooler loop employing a glycol-water coolant and including a low temperature reservoir, said charge air cooler loop operatively connected to cool air flowing into said manifold; and an air conditioning system bypass loop operatively connecting said air conditioning system to said charge air cooler loop;

where said charge air cooler low and said air conditioning system bypass loop are configured so that said air conditioning system bypass loop operates during vehicle braking to cool said glycol-water coolant to charge said low temperature reservoir.

* * * * *